(12) United States Patent
Iriyama et al.

(10) Patent No.: US 10,457,025 B2
(45) Date of Patent: Oct. 29, 2019

(54) SHEET

(71) Applicant: Dai Nippon Printing Co., Ltd., Tokyo (JP)

(72) Inventors: Kouhei Iriyama, Tokyo (JP); Toshinaru Kayahara, Tokyo (JP); Keita Toyota, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 15/554,525

(22) PCT Filed: Sep. 29, 2015

(86) PCT No.: PCT/JP2015/077522
§ 371 (c)(1),
(2) Date: Aug. 30, 2017

(87) PCT Pub. No.: WO2016/151899
PCT Pub. Date: Sep. 29, 2016

(65) Prior Publication Data
US 2018/0043669 A1  Feb. 15, 2018

(30) Foreign Application Priority Data
Mar. 26, 2015 (JP) .................................. 2015-064457

(51) Int. Cl.
*B32B 27/32* (2006.01)
*C08J 7/04* (2006.01)
(Continued)

(52) U.S. Cl.
CPC .............. *B32B 27/32* (2013.01); *B32B 27/08* (2013.01); *B32B 27/20* (2013.01); *C08J 7/04* (2013.01);
(Continued)

(58) Field of Classification Search
CPC ................ Y10T 428/24893; Y10T 428/24942
See application file for complete search history.

(56) References Cited

U.S. PATENT DOCUMENTS 9,352,611 B2   5/2016 Akou et al.
9,696,465 B2   7/2017 Miyake et al.
(Continued)

FOREIGN PATENT DOCUMENTS

CN   100528558 C   8/2009
CN   103842176 A   6/2014
(Continued)

OTHER PUBLICATIONS

International Search Report dated Dec. 28, 2015, issued for PCT/JP2015/077522.
(Continued)

*Primary Examiner* — Betelhem Shewareged
(74) *Attorney, Agent, or Firm* — Locke Lord LLP

(57) ABSTRACT

The present invention provides a sheet, wherein the sheet has an excellent low-gloss feeling; even when oblique light is incident on a surface of the sheet, diffuse reflection of the light is suppressed, the surface is less likely to look white when viewed obliquely, and a design represented on the sheet can be visually recognized; and the sheet has excellent designability. In the sheet, a surface of the sheet has an arithmetic average roughness Ra (JIS B0633: 2001) of 0.7 μm or less, and the reflectance at a detection angle equal to a regular reflection angle ±5°, measured by a variable angle photometer when the surface is irradiated with incident light at an incident angle of 75°, is 50% or less of the reflectance at the regular reflection angle.

18 Claims, 2 Drawing Sheets

(51) Int. Cl.
*E04F 15/16* (2006.01)
*B32B 27/08* (2006.01)
*B32B 27/20* (2006.01)

(52) U.S. Cl.
CPC ............... *C08J 7/042* (2013.01); *E04F 15/16* (2013.01); *B32B 2255/10* (2013.01); *B32B 2255/26* (2013.01); *B32B 2255/28* (2013.01); *B32B 2264/02* (2013.01); *B32B 2264/102* (2013.01); *B32B 2307/406* (2013.01); *B32B 2307/412* (2013.01); *B32B 2307/416* (2013.01); *B32B 2307/538* (2013.01); *B32B 2307/732* (2013.01); *B32B 2310/08* (2013.01); *B32B 2363/00* (2013.01); *B32B 2367/00* (2013.01); *B32B 2471/00* (2013.01); *B32B 2607/02* (2013.01); *Y10T 428/24893* (2015.01); *Y10T 428/24942* (2015.01)

(56) References Cited

U.S. PATENT DOCUMENTS

| | | | |
|---|---|---|---|
| 9,914,285 | B2 | 3/2018 | Akou et al. |
| 2005/0221054 | A1* | 10/2005 | Kawano ................. G02B 1/105 428/143 |
| 2013/0065490 | A1* | 3/2013 | Landin ..................... B24B 1/00 451/28 |
| 2014/0255669 | A1 | 9/2014 | Akou et al. |
| 2015/0092276 | A1 | 4/2015 | Miyake et al. |
| 2016/0236447 | A1 | 8/2016 | Akou et al. |

FOREIGN PATENT DOCUMENTS

| | | |
|---|---|---|
| CN | 104380152 A | 2/2015 |
| EP | 1669193 A1 | 6/2006 |
| JP | 06-262133 A | 9/1994 |
| JP | 2008120031 A | 5/2008 |
| JP | 2009-291961 A | 12/2009 |
| JP | 4712306 B2 | 6/2011 |
| JP | 2012-091487 A | 5/2012 |
| JP | 2013-031995 A | 2/2013 |
| JP | 2013067038 A | 4/2013 |
| JP | 2014-188742 A | 10/2014 |
| JP | 2014-195875 A | 10/2014 |
| JP | 2014-236123 A | 12/2014 |
| JP | 2015-187378 A | 10/2015 |

OTHER PUBLICATIONS

The extended European search report dated Nov. 23, 2018 issued for corresponding European Patent Application No. 15886451.2.
Office Action dated Sep. 11, 2018 issued for corresponding Chinese Patent Application No. 201580078270.7.
Office Action dated Mar. 12, 2019 for the corresponding Chinese patent application No. 201580078270.7 and English translation thereof.
Office Action dated Apr. 30, 2019, issued for the corresponding KR patent application No. 10-2017-7029726 and English translation thereof.

* cited by examiner

SHEET

TECHNICAL FIELD

The present invention relates to a sheet.

BACKGROUND ART

Conventionally, sheets are laminated on the surface of various articles in order to impart designability. For example, on the surface of interior materials, such as wall-covering materials used for wall surfaces of buildings, and floor decorative materials used for floors, decorative sheets printed with picture patterns, such as wood-grain patterns, are laminated and used. Such interior materials are used as alternatives to interior materials made of natural wood.

Sheets laminated on the surface of the articles mentioned above are required to suppress surface gloss in order to enhance their designability. High surface gloss causes problems of texture being degraded due to the reflection of light from a lighting apparatus, such as a fluorescent lamp, and of the surface looking shiny white due to the reflected light.

As decorative sheets that overcome these problems, for example, PTL 1 and PTL 2 propose decorative sheets having an uppermost surface layer formed of an ionizing radiation-curable resin containing a matte filler.

These decorative sheets have an excellent low-gloss feeling and effectively suppress the reflection of light; however, there is still room to examine the suppression of the reflection of light on the surface of the sheets. Further designability is required. In particular, in the case of a sheet laminated on a flat adherend, when oblique light is incident on the flat surface from a lighting apparatus or the like, the light is diffusely reflected, and the surface looks shiny white when viewed obliquely. Thus, it is difficult to visually recognize the design, such as a picture, represented on the sheet, and the reduction in designability is a problem. In particular, when oblique light is incident on the surface of the above sheet, the surface looks shiny white when viewed obliquely at a wider angle, and it is more difficult to visually recognize the design, compared with the surface of interior materials made of natural wood. Therefore, these sheets are required to satisfy the following requirements: even when oblique light is incident on the surface, diffuse reflection of the light is suppressed, the surface is less likely to look white when viewed obliquely, and the design represented on the sheet can be visually observed.

Hence, there is a demand for development of a sheet, wherein the sheet has an excellent low-gloss feeling; even when oblique light is incident on a surface of the sheet, diffuse reflection of the light is suppressed, the surface is less likely to look white when viewed obliquely, and a design represented on the sheet can be visually recognized; and the sheet has excellent designability.

CITATION LIST

Patent Literature

PTL 1: JP2012-91487A
PTL 2: JP2013-31995A

SUMMARY OF INVENTION

Technical Problem

An object of the present invention is to provide a sheet, wherein the sheet has an excellent low-gloss feeling; even when oblique light is incident on a surface of the sheet, diffuse reflection of the light is suppressed, the surface is less likely to look white when viewed obliquely, and a design represented on the sheet can be visually recognized; and the sheet has excellent designability.

Solution to Problem

As a result of extensive research, the present inventors found that the above object can be achieved by a sheet, wherein the arithmetic average roughness Ra (JIS B0633: 2001) of a surface of the sheet is within a specific range, and the reflectance at a detection angle equal to a regular reflection angle +5° and the reflectance at the detection angle equal to the regular reflection angle −5°, measured by a variable angle photometer when the surface is irradiated with incident light at an incident angle of 75°, are within a specific range. Thus, the present invention has been completed.

Specifically, the present invention relates to the following sheets.

1. A sheet, wherein a surface of the sheet has an arithmetic average roughness Ra (JIS B0633: 2001) of 0.7 μm or less, and the reflectance at a detection angle equal to a regular reflection angle ±5°, measured by a variable angle photometer when the surface is irradiated with incident light at an incident angle of 75°, is 50% or less of the reflectance at the regular reflection angle.

2. The sheet according to item 1, wherein the sheet has a surface-protecting layer comprising an ionizing radiation-curable resin on an uppermost surface.

3. The sheet according to item 2, wherein the surface-protecting layer comprises silica fine particles and resin beads.

4. The sheet according to any one of items 1 to 3, wherein the sheet has a transparent resin layer comprising a polyolefin resin.

5. The sheet according to any one of items 1 to 4, wherein the sheet has a picture pattern layer.

6. The sheet according to item 5, wherein at least the picture pattern layer, the transparent resin layer, and the surface-protecting layer are laminated in this order on a base material sheet.

7. The sheet according to any one of items 1 to 6, wherein the sheet has a thickness of 50 to 600 μm.

8. The sheet according to any one of items 1 to 7, wherein the sheet is a decorative sheet.

9. The sheet according to any one of items 1 to 7, wherein the sheet is a decorative sheet for floor materials.

In the sheet of the present invention, a surface of the sheet has an arithmetic average roughness Ra (JIS B0633: 2001) of 0.7 μm or less, and the reflectance at a detection angle equal to a regular reflection angle ±5° (hereinafter also simply referred to as "the reflectance at a regular reflection angle ±5°"), measured by a variable angle photometer when the surface is irradiated with incident light at an incident angle of 75°, is 50% or less of the reflectance at the regular reflection angle. In the present specification, the incident angle and the regular reflection angle refer, respectively, to the angles of incident light and reflected light relative to the normal line of the surface of the sheet.

Since the surface of the sheet of the present invention has the above structure, the sheet has an excellent low-gloss feeling, and even when oblique light is incident on the surface, diffuse reflection of the light on the sheet surface when viewed obliquely is suppressed. Generally, even when the surface of a sheet has a low-gloss feeling, light is diffusely reflected when the sheet is viewed obliquely, and a specific area of the sheet surface looks white. Thus, the design originally represented on the sheet cannot be visually recognized. In contrast, the sheet of the present invention has a structure wherein a surface of the sheet has an arithmetic average roughness Ra of 0.7 µm or less, and the reflectance at a regular reflection angle ±5°, measured when the surface is irradiated with incident light at an incident angle of 75°, is 50% or less of the reflectance at the regular reflection angle; therefore, diffuse reflection of the incident light on the sheet surface is suppressed, and the design, such as a picture, represented on the sheet can be visually recognized when the surface of the sheet of the present invention is viewed at an angle slightly (about ±5°) deviated from the regular reflection angle of the incident light. Accordingly, the sheet of the present invention has excellent designability.

The sheet of the present invention is described in detail below. In the sheet of the present invention, the surface refers to a "front surface," which is a surface of the sheet of the present invention, when laminated on an adherend or the like, opposite to a surface in contact with the adherend. This surface is to be viewed after lamination. Further, in the present specification, a direction of the above surface of the sheet of the present invention is also referred to as "the front surface" or "above," and the opposite direction is also referred to as "the back surface" or "below."

Sheet

The sheet of the present invention has a surface with an arithmetic average roughness Ra of 0.7 µm or less, as measured according to JIS B0633: 2001. If Ra exceeds 0.7 µm, incident light is likely to be diffusely reflected on the sheet surface, and it is difficult to adjust the reflectance at a regular reflection angle ±5° to 50% or less of the reflectance at the regular reflection angle. When oblique light is incident on the surface, the light is diffusely reflected, and a specific area of the sheet surface looks white when viewed obliquely. Thus, the design originally represented on the sheet cannot be visually recognized. Ra is preferably 0.6 µm or less.

In the present specification, an irregular shape that is formed on the surface of the sheet by adjusting the arithmetic average roughness Ra of the surface to 0.7 µm or less through the use of an extender pigment, resin beads, emboss shaping, etc., described later, and that contributes to designability and imparts texture is simply referred to as an "irregular shape." This shape is differentiated from "unevenness (daku)," which indicates unevenness due to daku; "visual recesses" and a "feeling of visual unevenness," both of which are visually recognized as unevenness; and "projecting shapes formed by a gloss-adjusting layer." All of these are described later.

The method for forming the surface of the sheet of the present invention into the irregular shape mentioned above is not particularly limited. Examples include a method in which an extender pigment, such as silica, is incorporated into a layer serving as an uppermost surface, and a method in which an irregular shape is formed on the sheet surface using an embossing plate so that the arithmetic average roughness Ra (JIS B0633: 2001) is 0.7 µm or less.

The sheet of the present invention has the irregular shape mentioned above on the surface thereof; however, other embossed shapes, such as wood-grain vessel patterns, may be formed, as shown in FIG. 1, within a range that does not prevent the effects of the present invention. FIG. 1 is a cross-sectional view showing an example of the sheet of the present invention. The sheet 1 of the present invention shown in FIG. 1 has plane parts 9 having an irregular shape formed by an extender pigment, etc., mentioned above, on the surface thereof, and wood-grain vessel patterns 10 are formed between the plane parts 9. The other embossed shapes are not limited to wood-grain vessel patterns. Examples include stone sheet surface concave-convex patterns (granite cleavage planes, etc.), textile surface textures, matte patterns, grain patterns, hairline patterns, linear streak patterns, etc.

In the sheet of the present invention, the reflectance at a regular reflection angle ±5°, measured by a variable angle photometer when the surface is irradiated with incident light at an incident angle of 75°, is 50% or less of the reflectance at the regular reflection angle. If the reflectance at the regular reflection angle ±5° exceeds 50% of the reflectance at the regular reflection angle, diffuse reflection of oblique light incident on the sheet surface cannot be sufficiently suppressed, and the design represented on the sheet cannot be visually recognized when the sheet is viewed obliquely. The reflectance at the regular reflection angle ±5° is preferably 40% or less of the reflectance at the regular reflection angle. The lower limit of the ratio of the reflectance at the regular reflection angle ±5° to the reflectance at the regular reflection angle is not particularly limited. A smaller ratio is more preferable.

In the present specification, the reflectance is a value measured using a variable angle photometer (trade name: GC5000L, produced by Nippon Denshoku Industries Co., Ltd.) under measurement conditions in which the incident angle of incident light is 75°. The ratio of the reflectance at a regular reflection angle ±5° to the reflectance at the regular reflection angle is a value calculated by the following formula:

[Ratio of reflectance at regular reflection angle ±5° to reflectance at regular reflection angle (%)]= [(reflectance at regular reflection angle ±5° (%))/(reflectance at regular reflection angle (%))]×100

In the sheet of the present invention, the 60° gloss of the surface is preferably 10 or less, and more preferably 7 or less. Due to the 60° gloss of the surface of the sheet of the present invention within the above range, a sheet having an excellent low-gloss feeling can be obtained. In the present specification, the 60° gloss is a value measured by a method according to JIS Z-8741 using a gloss meter (trade name: GMX-202, produced by Murakami Color Research Laboratory).

The sheet of the present invention preferably has a thickness of 50 to 600 µm, and more preferably 100 to 250 µm. Due to the thickness within the above range, the sheet of the present invention has more excellent designability and has scratch resistance.

Layer Structure of Sheet

The specific structure (layer structure) of the sheet of the present invention is not limited, as long as a surface of the sheet has an arithmetic average roughness Ra (JIS B0633: 2001) of 0.7 µm or less. For example, when the sheet of the present invention is a decorative sheet, the sheet comprises, for example, a base material sheet, and a picture pattern layer, a transparent adhesive layer, a transparent resin layer, a primer layer, and a surface-protecting layer sequentially laminated on the base material sheet.

Using the sheet having the above layer structure as a representative example, each layer is described in detail below.

Base Material Sheet

The base material sheet is a layer on the surface (front surface) of which a picture pattern layer, etc., are sequentially laminated. For example, the base material sheet is preferably a sheet (film) formed of a thermoplastic resin. Specific examples include polyvinyl chloride, polyethylene terephthalate, polybutylene terephthalate, polyamide, polyethylene, polypropylene, polycarbonate, polyethylene naphthalate, ethylene-vinyl acetate copolymers, ethylene-acrylic acid copolymers, ethylene-acrylic acid ester copolymers, ionomers, acrylic acid esters, methacrylic acid esters, and the like. The base material sheet is formed by using these resins singly or in a combination of two or more.

The base material sheet may be colored. In this case, the base material sheet can be colored by adding a colorant (pigment or dye) to a thermoplastic resin mentioned above. Examples of colorants include inorganic pigments, such as titanium dioxide, carbon black, and iron oxide; organic pigments, such as phthalocyanine blue; and various dyes. One or more such colorants may be selected from known or commercially available products. The amount of colorant(s) may be determined according to the desired color, etc.

The base material sheet may contain various additives, such as fillers, matting agents, foaming agents, flame retardants, lubricants, antistatic agents, antioxidants, ultraviolet absorbers, and light stabilizers, as required.

The thickness of the base material sheet can be suitably determined depending on the application of the final product, the method of use of the final product, etc. In general, the thickness of the base material is preferably 20 to 300 µm.

The surface (front surface) of the base material sheet may be subjected to a corona discharge treatment, if necessary, in order to increase the adhesion of the ink that forms the picture pattern layer etc. Methods and conditions for the corona discharge treatment may be determined according to known methods. If necessary, a corona discharge treatment may also be performed on the back surface of the base material sheet, or a back-surface primer layer, described later, may be formed.

Picture Pattern Layer

The picture pattern layer gives a desired picture (design) to the sheet, and the type, etc., of picture are not limited. Examples thereof include wood grain patterns, leather patterns, marble grain patterns, pebbly patterns, tiled patterns, brick-masonry patterns, textile patterns, geometric figures, characters, symbols, and abstraction patterns.

The method of forming the picture pattern layer is not particularly limited. For example, the picture pattern layer may be formed on the surface of the base material sheet by a printing method that uses ink obtained by dissolving (or dispersing) a known colorant (dye or pigment) together with a binding resin in a solvent (or a dispersion medium). The ink can be an aqueous composition, in terms of reducing the VOC of the sheet.

Examples of colorants include inorganic pigments, such as carbon black, titanium white, zinc white, red oxide, Berlin blue, and cadmium red; organic pigments, such as azo pigments, lake pigments, anthraquinone pigments, quinacridone pigments, phthalocyanine pigments, isoindolinone pigments, and dioxazine pigments; metallic powder pigments, such as aluminium powder and bronze powder; pearlescent pigments, such as titanium oxide-coated mica and bismuth chloride oxide; fluorescent pigments; noctilucent pigments; and the like. Such colorants may be used singly or in a combination of two or more. These colorants may be used in combination with a filler (e.g., silica), an extender pigment (e.g., organic beads), a neutralizer, a surfactant, etc.

Examples of binding resins include hydrophilized polyester-based urethane resins, which can be used in combination with polyesters, polyacrylates, polyvinyl acetate, polybutadiene, polyvinyl chloride, chlorinated polypropylene, polyethylene, polystyrene, polystyrene-acrylate copolymers, rosin derivatives, alcohol adducts of styrene-maleic anhydride copolymers, cellulose-based resins, etc. Specific examples include polyacrylamide-based resins, poly(meth)acrylate-based resins, polyethylene oxide-based resins, poly N-vinyl-pyrrolidone-based resins, water-soluble polyester-based resins, water-soluble polyamide-based resins, water-soluble amino-based resins, water-soluble phenol-based resins, and other water-soluble synthetic resins; polynucleotides, polypeptides, polysaccharides, and like water-soluble natural polymers; etc. Other examples include natural rubber, synthetic rubber, polyvinyl acetate-based resins, (meth)acrylic-based resins, polyvinyl chloride-based resins, modified polyurethane-polyacrylic-based resins, etc., mixtures of natural rubber and the like mentioned above, and other resins. These binding resins can be used singly or in a combination of two or more.

The thickness of the picture pattern layer is not particularly limited, and can be suitably determined according to product characteristics. The layer thickness during coating is about 1 to 15 µm, and the layer thickness after drying is about 0.1 to 10 µm.

When the sheet of the present invention does not have a picture pattern layer, a transparent layer can be used to constitute the sheet of the present invention so that the pattern of an adherend, such as a woody base material, is visible through the above sheet. Thus, the pattern of the adherend can be directly used as a design. Because of this structure, the design expressed by the pattern of the adherend has an excellent low-gloss feeling due to the sheet of the present invention, diffuse reflection of light on the sheet surface is suppressed even when the sheet is viewed obliquely, the design can be visually recognized, and the sheet has excellent designability.

Adhesive Layer

In order to increase the adhesion between the transparent resin layer and the picture pattern layer, an adhesive layer may be formed on the picture pattern layer. The adhesive layer is preferably a transparent adhesive layer. Examples of the transparent adhesive layer include any of colorless transparent, colored transparent, semitransparent, etc.

The adhesive is not particularly limited, and any adhesive known in the field of decorative sheets can be used. Examples of adhesives known in the field of decorative sheets include thermoplastic resins, such as polyamide resin, acrylic resin, and vinyl acetate resin; thermosetting resins, such as urethane-based resin; and the like. These adhesives can be used singly or in a combination of two or more. It is also possible to use a two-component curable polyurethane resin containing isocyanate as a curing agent or a polyester resin.

Although the thickness of the adhesive layer is not particularly limited, the thickness after drying is about 0.1 to 30 µm, and preferably about 1 to 20 µm.

Transparent Resin Layer

The transparent resin layer is not particularly limited, as long as it is transparent. Any of colorless transparent, colored transparent, semitransparent, etc., is included. Examples of the resin that constitutes the transparent resin layer include polyethylene terephthalate, polybutylene terephthalate, polyamide, polyethylene, polypropylene, ethylene-vinyl acetate copolymers, ethylene-acrylic acid copolymers, ethylene-acrylic acid ester copolymers, ionomers, polymethylpentene, acrylic acid esters, methacrylic acid esters, polycarbonate, cellulose triacetate, and the like. These resins can be used singly or in combination of two or more.

A polyolefin resin, typified by polypropylene resin, is preferably used. Therefore, when a polyolefin resin is used for the transparent resin layer, various polyolefin resins mentioned as examples of the resin that constitutes the base material sheet can be used.

The transparent resin layer may be colored, as long as it is transparent; however, it is particularly desirable that no colorant be mixed.

The thickness of the transparent resin layer is generally about 20 to 200 μm; however, the thickness of the transparent resin layer may exceed the above range, depending on the application, etc., of the sheet.

When the layer structure of the sheet of the present invention does not comprise a surface-protecting layer, it is preferable that the transparent resin layer serve as a layer on the uppermost surface of the sheet, and that the irregular shape of the sheet of the present invention is formed on the surface of the transparent resin layer. Examples of the method for forming the irregular shape of the sheet of the present invention on the surface of the transparent resin layer include a method using an embossing plate to form the irregular shape on the surface of the transparent resin layer.

Primer Layer

A primer layer may be provided on the transparent resin layer. The primer layer can be formed by applying a known primer agent to the surface of the transparent resin layer. Examples of primer agents include urethane resin primer agents comprising an acrylic-modified urethane resin (an acrylic urethane resin), etc., primer agents comprising a urethane-cellulose resin (e.g., a resin obtained by adding hexamethylene diisocyanate to a mixture of urethane and nitrocellulose), resin primer agents comprising a block copolymer of acrylic and urethane, and the like. Additives may be added to the primer agent, as required. Examples of additives include fillers, such as calcium carbonate and clay; flame retardants, such as magnesium hydroxide; antioxidants; lubricants; foaming agents; ultraviolet absorbers; light stabilizers; etc. The amount of additives can be suitably determined according to product characteristics.

The coating amount of the primer agent is not particularly limited, but is generally about 0.1 to 100 $g/m^2$, and preferably about 0.1 to 50 $g/m^2$.

The thickness of the primer layer is not particularly limited, but is generally about 0.01 to 10 μm, and preferably about 0.1 to 1 μm.

Surface-Protecting Layer

The resin that constitutes the surface-protecting layer is preferably a curable resin, such as a thermosetting resin or an ionizing radiation-curable resin (e.g., an electron beam-curable resin). Ionizing radiation-curable resins are particularly preferable in terms of high surface hardness, productivity, etc.

Examples of thermosetting resins include unsaturated polyester resins, polyurethane resins (including two-component curable polyurethane), epoxy resins, amino alkyd resins, phenol resins, urea resins, diallyl phthalate resins, melamine resins, guanamine resins, melamine-urea copoly-condensation resins, silicone resins, polysiloxane resins, and the like.

These resins may contain crosslinking agents, curing agents (e.g., polymerization initiators), and polymerization accelerators. Examples of curing agents include isocyanate, organic sulfonic acid salts, etc., which can be added to unsaturated polyester resins, polyurethane resins, etc.; organic amines, etc., which can be added to epoxy resins; peroxides, such as methyl ethyl ketone peroxide, and radical initiators, such as azoisobutylnitrile, which can be added to unsaturated polyester resins.

As the method for forming the surface-protecting layer using a thermosetting resin, for example, a solution of the thermosetting resin is applied by a coating method, such as roll coating or gravure coating, followed by drying and curing.

The ionizing radiation-curable resin is not limited, as long as it induces a crosslinking polymerization reaction upon irradiation with ionizing radiation and is converted into a three-dimensional polymer structure. For example, one or more types of prepolymers, oligomers, and monomers that have, in the molecule, a polymerizable unsaturated bond crosslinkable by irradiation with ionizing radiation, or an epoxy group can be used. Examples include acrylate resins, such as urethane acrylate, polyester acrylate, and epoxy acrylate; silicone resins, such as siloxane; polyester resins; epoxy resins; and the like.

Examples of ionizing radiation include visible rays, ultraviolet rays (near ultraviolet rays, vacuum ultraviolet rays, etc.), X rays, electron beams, ionic lines, etc. Of these, ultraviolet rays and/or electron beams are desirable.

Examples of the source of ultraviolet rays include ultra-high-pressure mercury lamps, high-pressure mercury lamps, low-pressure mercury lamps, carbon arc lamps, black-light fluorescent lamps, metal halide lamps, and like light sources. The wavelength of ultraviolet rays is about 190 to 380 nm.

Examples of the electron beam source include various electron beam accelerators, such as Cockoroft-Walton, Van de Graaff, resonance transformer, insulated core transformer, linear, Dynamitron, and high-frequency accelerators. The energy of the electron beam is preferably about 100 to 1000 keV, and more preferably about 100 to 300 keV. The exposure dose of the electron beam is preferably about 2 to 15 Mrad.

Although the ionizing radiation-curable resin is sufficiently cured by irradiation with an electron beam, it is preferable to add a photopolymerization initiator (sensitizer) when the resin is cured by irradiation with ultraviolet rays.

The photopolymerization initiator used in the case of a resin having a radically polymerizable unsaturated group is, for example, at least one of acetophenones, benzophenones, thioxanthones, benzoin, benzoin methyl ether, Michler's benzoyl benzoate, Michler's ketone, diphenyl sulfide, dibenzyl disulfide, diethyl oxide, triphenyl biimidazole, isopropyl-N,N-dimethylaminobenzoate, etc. Moreover, the photopolymerization initiator used in the case of a resin having a cation polymerizable functional group is, for example, at least one of aromatic diazonium salts, aromatic sulfonium salts, metallocene compounds, benzoin sulfonate, furyloxy sulfoxonium diallyliodosyl salts, or the like.

The amount of the photopolymerization initiator added is not particularly limited, but is generally about 0.1 to 10 parts by mass based on 100 parts by mass of the ionizing radiation-curable resin.

As the method for forming the surface-protecting layer using an ionizing radiation-curable resin, for example, a solution of the ionizing radiation-curable resin may be applied by a coating method, such as gravure coating or roll coating.

The thickness of the surface-protecting layer is generally about 0.1 to 50 μm, and preferably about 1 to 20 μm.

The surface-protecting layer may further contain various additives, such as solvents, dyes, extender pigments, fillers (e.g., extenders), antifoaming agents, leveling agents, and thixotropy-imparting agents, as required.

The extender pigment added to the surface-protecting layer is not particularly limited, as long as it does not impair the designability represented on the sheet of the present invention. Any known or commercially available extender pigment can be used. Usable examples include inorganic fine particles, such as silica fine particles, silicone resin, talc, clay, barium sulfate, barium carbonate, calcium sulfate, calcium carbonate, magnesium carbonate, and the like. Of these, silica fine particles are preferable in terms of excellent scratch resistance.

The amount of the extender pigment added to the surface-protecting layer is preferably 5 to 50 parts by mass, and more preferably 10 to 30 parts by mass, based on 100 parts by mass of the resin solids content of the resin that forms the surface-protecting layer. Due to the amount of the extender pigment within the above range, the surface of the sheet of the present invention can be formed into the irregular shape mentioned above.

The average particle size of the extender pigment is preferably 0.5 to 35 μm, and more preferably 2 to 14 μm. Due to the average particle size of the matting agent within this range, the surface of the surface-protecting layer can be formed into the irregular shape of the sheet of the present invention, the surface of the surface-protecting layer has a low-gloss feeling, and stain resistance and scratch resistance required for the surface of the sheet can be imparted.

The average particle size of the extender pigment is preferably less than the thickness of the surface-protecting layer. Due to the structure in which the average particle size of the extender pigment is less than the thickness of the surface-protecting layer, projection of the extender pigment from the surface-protecting layer is suppressed, diffuse reflection of incident light is suppressed, and the design represented on the sheet can be more easily visually recognized.

The surface-protecting layer may further contain resin beads. Because the surface-protecting layer contains resin beads, the cloudiness of the surface-protecting layer caused by the extender pigment, etc., contained therein can be suppressed.

The resin beads are not particularly limited. Examples include acrylic beads, urethane beads, polyethylene beads, polypropylene beads, polycarbonate beads, polyvinyl chloride beads, melamine beads, nylon beads, styrene-acrylic copolymer beads, and the like. Of these, acrylic beads are preferable in terms of excellent transparency.

The amount of the resin beads added to the surface-protecting layer is preferably 2 to 40 parts by mass, and more preferably 4 to 30 parts by mass, based on 100 parts by mass of the resin solids content of the resin that forms the surface-protecting layer. Due to the amount of the resin beads within this range, the surface of the sheet of the present invention can be formed into the irregular shape mentioned above.

The average particle size of the resin beads is preferably 0.5 to 20 μm, and more preferably 2 to 14 μm. Due to the average particle size of the resin beads within this range, the cloudiness of the surface-protecting layer can be further suppressed.

The average particle size of the resin beads is preferably less than the thickness of the surface-protecting layer. Because of the structure in which the average particle size of the resin beads is less than the thickness of the surface-protecting layer, projection of the resin beads from the surface-protecting layer is suppressed, diffuse reflection of incident light is suppressed, and the design represented on the sheet can be more easily visually recognized.

When the surface-protecting layer does not comprise an extender pigment, the surface of the sheet of the present invention may be formed into the irregular shape mentioned above by a method using an embossing plate to form the irregular shape mentioned above on the sheet surface. Alternatively, the surface of the sheet of the present invention may be formed into the irregular shape mentioned above by incorporating an extender pigment into the surface-protecting layer, and embossing the sheet surface.

When the sheet of the present invention has a gloss-adjusting layer, described later, the surface-protecting layer is preferably formed adjacent to the gloss-adjusting layer. Specifically, the back surface and/or side surface of the surface-protecting layer are/is preferably adjacent to the gloss-adjusting layer. When the sheet of the present invention has a gloss-adjusting layer, the surface-protecting layer is preferably transparent.

The surface-protecting layer preferably contains, as extender pigments, fine particles A having a particle size equal to or less than the thickness of the surface-protecting layer, and fine particles B having a particle size greater than the thickness of the surface-protecting layer. In the present specification, it can be confirmed by a SEM (scanning electron microscope) that the particle size of the fine particles A is equal to or less than the thickness of the surface-protecting layer, and that the particle size of the fine particles B is greater than the thickness of the surface-protecting layer. For example, it can be confirmed by cutting the sheet in a direction perpendicular to the surface thereof, and observing the part of the surface-protecting layer of the obtained cross-section using a SEM (scanning electron microscope).

The particle size of the fine particles A is not particularly limited, as long as it is equal to or less than the thickness of the surface-protecting layer. If the particle size of the fine particles A exceeds the thickness of the surface-protecting layer, the matte effect may not be sufficient. Further, the fine particles A project from the surface-protecting layer, and portions of the fine particles A projecting from the surface-protecting layer are rubbed and shaved. Gloss appears on the rubbed portions and is noticeable, and scratch resistance may not be sufficient.

The particle size of the fine particles A is preferably 3 to 15 μm, and more preferably 8 to 12 μm. If the particle size of the fine particles A is too small, the matte effect may not be sufficient.

The content of the fine particles A is preferably 5 to 30 parts by mass based on 100 parts by mass of the resin component of the surface-protecting layer. If the content of the fine particles A is too high, the number of the fine particles A projecting from the surface-protecting layer increases. When the projecting portions are rubbed and shaved, gloss appears on the rubbed portions and is noticeable, and scratch resistance may not be sufficient. In contrast, if the content of the fine particles A is too low, the matte effect may not be sufficient.

The content of the fine particles A is preferably 10 to 20 parts by mass based on 100 parts by mass of the resin component of the surface-protecting layer.

The particle size of the fine particles B is not particularly limited, as long as it is greater than the thickness of the surface-protecting layer. If the particle size of the fine particles B is equal to or less than the thickness of the surface-protecting layer, the scratch resistance of the surface-protecting layer may not be sufficient.

The particle size of the fine particles B is preferably 8 to 33 µm, and more preferably 8 to 20 µm. If the particle size of the fine particles B is too large, they may be easily removed from the surface-protecting layer.

The content of the fine particles B is preferably 5 to 30 parts by mass based on 100 parts by mass of the resin component of the surface-protecting layer. If the content of the fine particles B is too high, when projecting portions of the fine particles B are rubbed and shaved, gloss appears on the rubbed portions and is noticeable, and scratch resistance may not be sufficient. In contrast, if the content of the fine particles B is too low, the scratch resistance of the surface-protecting layer may not be sufficient. The content of the fine particles B is preferably 10 to 20 parts by mass based on 100 parts by mass of the resin component of the surface-protecting layer.

In the present specification, the particle size of the fine particles A and B can be measured by a SEM (scanning electron microscope). For example, the particle size can be measured as the "average particle size" by cutting the decorative sheet in a direction perpendicular to the surface thereof, photographing any part of the obtained cross-section of the surface-protecting layer using a SEM (scanning electron microscope), and averaging the particle size (diameter) of each of the photographed fine particles A and B.

The total content of the fine particles A and B is preferably 15 to 35 parts by mass based on 100 parts by mass of the resin component of the surface-protecting layer. If the total content of the fine particles A and B is too low, the surface-protecting layer may have inferior scratch resistance and designability (low gloss). If the total content of the fine particles A and B is too high, there are many projecting portions of the fine particles A and B. When these portions are rubbed and shaved, gloss appears on the rubbed portions and is noticeable, and scratch resistance may not be sufficient. The total content of the fine particles A and B is preferably 20 to 35 parts by mass based on 100 parts by mass of the resin component of the surface-protecting layer.

The fine particles A and B are not particularly limited, as long as they can improve the scratch resistance of the surface-protecting layer depending on the particle size, and improve the matte effect. Known fine particles can be used. Examples of the fine particles A and B include inorganic particles, such as silica fine particles and silicone resin; organic particles, such as crosslinked alkyl, crosslinked styrene, benzoguanamine resin, urea-formaldehyde resin, phenolic resin, polyethylene, and nylon; and the like. Among these, silica fine particles are preferred.

Gloss-Adjusting Layer

The sheet of the present invention may comprise a gloss-adjusting layer. For example, FIGS. 2 to 4 show embodiments of sheets comprising a gloss-adjusting layer. FIGS. 2 to 4 each show the sheet 1 of the present invention, in which a picture pattern layer 4, a transparent resin layer 6, a gloss-adjusting layer 13, and a surface-protecting layer 8 are laminated on a base material sheet 3. The surface-protecting layer 8 contains fine particles A11 having a particle size equal to or less than the thickness of the surface-protecting layer 8, and fine particles B12 having a particle size greater than the thickness of the surface-protecting layer 8.

When the sheet of the present invention comprises a gloss-adjusting layer, the gloss-adjusting layer is preferably formed on the transparent resin layer so as to be adjacent to the surface-protecting layer. More specifically, the back surface of the gloss-adjusting layer is adjacent to the front surface of the transparent resin layer (or the primer layer when the decorative sheet of the present invention has the primer layer), and the front surface and/or side surface of the gloss-adjusting layer are/is adjacent to the surface-protecting layer.

In terms of designability, the gloss-adjusting layer may be formed (1) in part of the front surface (the surface of the sheet (decorative sheet) or the decorative plate to be viewed after the installation thereof), or (2) in the entire front surface (entire surface). That is, the gloss-adjusting layer may be formed (1) partially on the front surface, or (2) entirely on the front surface.

When (1) the gloss-adjusting layer is formed in part of the front surface, (a) the surface-protecting layer may be formed in part of the front surface, or (b) the surface-protecting layer may be formed on the entire front surface. When the gloss-adjusting layer and the surface-protecting layer are both formed in part of the front surface (in the case of (1) (a) above), the surface-protecting layer is formed so as to cover a region in which the gloss-adjusting layer is not formed (a region in which the gloss-adjusting layer is not present). In the embodiment of FIG. 2, the gloss-adjusting layer is formed in part of the front surface, and the surface-protecting layer is formed on the entire front surface (embodiment (1) (b) above). In the embodiment of FIG. 3, the gloss-adjusting layer is formed in part of the front surface, and the surface-protecting layer is formed in part of the front surface (embodiment (1) (a) above).

On the other hand, when (2) the gloss-adjusting layer is formed on the entire front surface, the surface-protecting layer is formed in part of the front surface. In the embodiment of FIG. 4, the gloss-adjusting layer is formed on the entire front surface, and the surface-protecting layer is formed in part of the front surface (embodiment (2) above).

Here, the gloss value of the gloss-adjusting layer is represented by $G_A$, and the gloss value of the surface-protecting layer is represented by $G_P$. When the sheet of the present invention has a gloss-adjusting layer, the relationship between the gloss value $G_A$ of the gloss-adjusting layer and the gloss value $G_P$ of the surface-protecting layer is preferably $G_P \neq G_A$. The values $G_A$ and $G_P$ in the present specification are measured according to Japanese Industrial Standard JIS Z8741. Specifically, in the present invention, the gloss value is measured by a gloss meter (PG-3D, produced by Nippon Denshoku Industries Co., Ltd.) at an incident angle of 60°. In the present specification, the gloss value (tsuya chi, in Japanese) is also called "koutaku chi" or "gurosu chi" in Japanese.

When (1) the gloss-adjusting layer is formed in part of the front surface, or when (2) the gloss-adjusting layer is formed on the entire front surface, the gloss-adjusting layer and the surface-protecting layer are both viewed from the surface of the sheet (decorative sheet) or the decorative plate to be viewed after the installation thereof, and the relationship between the gloss value of the gloss-adjusting layer and the gloss value of the surface-protecting layer is preferably $G_P \neq G_A$. In this case, when the sheet (decorative sheet) of the present invention is bonded to an adherend, the influence of unevenness (daku) formed on the surface of the sheet is further suppressed, and the designability of the sheet or the decorative plate is enhanced. Accordingly, the sheet of the present invention comprising a gloss-adjusting layer is a preferable embodiment of the present invention.

Next, the case (1) where the gloss-adjusting layer is formed in part of the front surface (this case is also simply referred to as "the case (1)") is described. In the case (1), it is preferable that the ratio of the area of a region in which the gloss-adjusting layer is formed, per $cm^2$ of the area of the front surface of the sheet (decorative sheet) or the decorative plate be 20 to 80%. In this case, it is preferable that the gloss-adjusting layer be formed so that the front surface (the surface to be viewed) of the gloss-adjusting layer has a picture pattern. When the gloss-adjusting layer has a picture pattern, and the above-mentioned area ratio is 20 to 80%, the gloss difference between the gloss-adjusting layer and the surface-protecting layer is more significant, and designability is consequently enhanced. In addition, it is possible to further suppress the influence of unevenness (daku). When the gloss-adjusting layer is formed to have a picture pattern, the type of picture pattern is not particularly limited. Examples of the specific type of picture pattern include the same picture patterns mentioned above as examples of the picture pattern layer.

In the present specification, the ratio of the area of a region in which the gloss-adjusting layer is formed (a region in which the gloss-adjusting layer is present), per $cm^2$ of the area of the front surface of the sheet (decorative sheet) or the decorative plate, is also referred to as "the occupancy area ratio of the gloss-adjusting layer." The occupancy area ratio of the gloss-adjusting layer is calculated from plate-making data in the stage of producing a plate for forming the gloss-adjusting layer. The occupancy area ratio of the gloss-adjusting layer can also be calculated from the shape of the plate.

In the case (1), in order to further suppress the influence of unevenness (daku) (in order to make it further difficult to recognize unevenness (daku)), the relationship between $G_A$ and $G_P$ is preferably $G_A<G_P$, and more preferably $G_A<G_P$, and $G_A \leq 5$.

In the case (1), the mechanism for allowing the sheet of the present invention to have excellent designability has not yet been sufficiently clarified. However, this is assumed to be attributable to the following reasons: when an uncured product, such as the curable resin of the surface-protecting layer to be formed on the surface of the gloss-adjusting layer in the case (1), is applied to the gloss-adjusting layer, the resin component of the gloss-adjusting layer and the uncured product of the surface-protecting layer lead to interactions, such as partial elution, dispersion, mixing, etc., depending on the combination of materials and the selection of coating conditions. Specifically, it is considered that the resin component in the ink of the gloss-adjusting layer in the case (1) and the resin component in the uncured product, such as the curable resin that forms the surface-protecting layer, are not brought into a completely dissolved state for a short time, but are in a suspended state, and are present on or in the vicinity of the gloss-adjusting layer; and that the portion in the suspended state scatters light to form a less-gloss region. Because the resin components in the suspended state are crosslinked and cured to form the surface-protecting layer, a region of the surface-protecting layer on the gloss-adjusting layer in the case (1) is considered to become at least a less-gloss region, and this region is considered to be visually recognized as recesses (hereinafter also referred to as "visual recesses") due to an optical illusion. Moreover, depending on the type of ink that forms the gloss-adjusting layer in the case (1), the type of the curable resin composition etc. that form the surface-protecting layer, and the coating conditions, the uppermost surface of the surface-protecting layer may be raised along with the formation of the gloss-adjusting layer in the case (1) to form projecting shapes (hereinafter also referred to as "the projecting shapes formed by the gloss-adjusting layer"). It is preferable that the surface of the surface-protecting layer have the projecting shapes formed by the gloss-adjusting layer, because light is also scattered in these portions, and a feeling of visual unevenness (hereinafter also referred to as the "visual unevenness feeling") is further emphasized. The height of the projecting shapes formed by the gloss-adjusting layer is preferably within a range in which the effects of the present invention are obtained. The height of the projecting shapes is generally in the range of 2 to 3 µm.

Next, the case (2) where the gloss-adjusting layer is formed on the entire front surface (this case is also simply referred to as "the case (2)") is described. In the case (2), it is preferable that the surface-protecting layer be formed in part of the front surface. In this case, it is more preferable that the surface-protecting layer be formed so that the front surface (the surface to be viewed) of the surface-protecting layer has a picture pattern. This further clarifies the gloss difference between the gloss-adjusting layer and the surface-protecting layer. As a result, designability can be further enhanced, and the influence of unevenness (daku) can be further suppressed. When the surface-protecting layer is formed to have a picture pattern, the type of picture pattern is not particularly limited. Examples of the specific type of picture pattern include the same picture patterns mentioned above as examples of the picture pattern layer.

In the case (2), in order to further suppress the influence of unevenness (daku) (in order to make it further difficult to recognize unevenness (daku)), the relationship between $G_A$ and $G_P$ is preferably $|G_P-G_A| \geq 2$, and more preferably $|G_P-G_A| \geq 10$ (in other words, the difference between the gloss value of the gloss-adjusting layer and the gloss value of the surface-protecting layer is preferably 2 or more, and this difference is preferably 10 or more). The relationship between $G_A$ and $G_P$ may be $G_A<G_P$ or $G_P<G_A$. That is, the gloss of the gloss-adjusting layer may be lower than that of the surface-protecting layer, or the gloss of the surface-protecting layer may be lower than that of the gloss-adjusting layer (in the case of $G_A<G_P$, the gloss-adjusting layer is a less-gloss layer; and in the case of $G_P<G_A$, the surface-protecting layer is a less-gloss layer). In the case (2), it is preferable that the ratio of the area of a region in which a less-gloss layer is present, per $cm^2$ of the area of the front surface of the sheet (decorative sheet) or the decorative plate exceed 50%.

In the present specification, the ratio of the area of a region in which the surface-protecting layer is formed (a region in which the surface-protecting layer is present), per $cm^2$ of the area of the front surface of the sheet (decorative sheet) or the decorative plate is also referred to as "the occupancy area ratio of the surface-protecting layer." The occupancy area ratio of the surface-protecting layer is calculated from plate-making data in the stage of producing a plate for forming the surface-protecting layer. The occupancy area ratio of the surface-protecting layer can also be calculated from the shape of the plate. On the other hand, the ratio of the area of a region in which the less-gloss layer is exposed (the exposure area ratio of the less-gloss layer), per $cm^2$ of the area of the front surface of the sheet (decorative sheet) or the decorative plate is obtained in the following manner:

(i) when the less-gloss layer is the surface-protecting layer, the occupancy area ratio of the surface-protecting layer is directly used as the occupancy area ratio of the less-gloss layer; or (ii) when the less-gloss layer is the gloss-adjusting layer, the occupancy area ratio of the surface-protecting layer is calculated, and then the occupancy area ratio of the surface-protecting layer is subtracted from 100(%).

The method for forming the gloss-adjusting layer is not particularly limited. For example, as with the picture pattern layer described above, the gloss-adjusting layer can be formed from ink obtained by dissolving (or dispersing) a known colorant (a dye, a pigment, etc.), a vehicle, etc., in a solvent (or a dispersion medium). The colorant and the solvent can be the same colorant and solvent mentioned above as examples of the colorant and solvent in the picture pattern layer.

In the case (1), the ink forming the gloss-adjusting layer is preferably one that induces interaction with the curable resin composition (uncured curable resin) that forms the surface-protecting layer, and is suitably selected in connection with the curable resin composition (uncured curable resin).

The specific vehicle for the ink forming the gloss-adjusting layer is preferably one containing 50 mass % or more of urethane-based resin and/or polyvinyl acetal-based resin. Examples of urethane-based resins include urethane resins obtained by reacting a polyol component, which is a polyol, such as acrylic polyol, polyester polyol, or polyether polyol, and an isocyanate component, which is an isocyanate, such as an aromatic isocyanate (e.g., tolylene diisocyanate, xylene diisocyanate, or diphenylmethane diisocyanate), or an aliphatic or alicyclic isocyanate (e.g., isophorone diisocyanate, hexamethylene diisocyanate, or hydrogenated tolylene diisocyanate) (both linearly crosslinked resins and mesh-like crosslinked resins can be used). Moreover, polyvinyl acetal-based resins are obtained by condensation (acetalization) of polyvinyl alcohols and aldehydes. Examples of polyvinyl acetal resins include polyvinyl formal (formal resin), polyvinyl acetoacetal, polyvinyl propional, polyvinyl butyral (butyral resin), polyvinyl hexylal, and the like. Among these, polyvinyl butyral is particularly preferred, because it is soluble in a solvent and easily formed into ink, and the appearance of a feeling of visual unevenness (visual recognition as recesses) is excellent.

In the case (1), the ink forming the gloss-adjusting layer may be colorless; however, due to coloring with a pigment, visual recesses are clearer, and a sheet having design effects excellent in the visual unevenness feeling and depth can be obtained. The pigment for coloring used in this case is preferably an inorganic pigment because it has excellent weather resistance and has concealing properties so that depth can be expressed, and because it has excellent adhesion with the surface-protecting layer. The inorganic pigment may be a single color or a mixture of two or more colors. As the inorganic pigment, a known pigment can be used. The color (pigment) used and the amount thereof may be suitably determined depending on the picture pattern of the picture printed layer.

Further, in order to adjust the gloss value, a gloss-control resin, such as an unsaturated polyester resin, an acrylic resin, or a vinyl chloride-vinyl acetate copolymer, may be mixed, as required. When a gloss-control resin is used, the mixing ratio thereof is preferably within the range of 10 to 50 mass % based on the total weight of the vehicle.

In the present invention, in the case (1), it is preferable that the surface-protecting layer be formed on the gloss-adjusting layer; that a region of the surface-protecting layer on the gloss-adjusting layer become at least a less-gloss region due to the interaction between the extender pigment-containing ink that forms the gloss-adjusting layer and the curable resin composition (uncured curable resin), etc., that form the surface-protecting layer; and that this region be visually recognized as recesses (visual recesses) due to an optical illusion. In this case, the film thickness of the gloss-adjusting layer is suitably 0.5 µm or more and 5.0 µm or less, in consideration of printability and interaction with the curable resin composition (uncured curable resin), etc.

Moreover, in the case (1), when an extender pigment is mixed in the ink for forming the gloss-adjusting layer, scattering of light can be promoted, and the effect of removing unevenness (daku) can be further enhanced. The extender pigment is not particularly limited. For example, it is suitably selected from silica, talc, clay, barium sulfate, barium carbonate, calcium sulfate, calcium carbonate, magnesium carbonate, etc. Preferred among these is silica, which is a material that has a high degree of freedom in material design, including oil absorbency, particle size, pore volume, etc., and that has excellent designability, whiteness, and coating stability as ink; and silica fine particles are particularly preferred.

The average particle size of silica used in the case (1) may be determined in relation with the film thickness (µm) of the gloss-adjusting layer, and is approximately 1.0 µm or more. The maximum particle size should be determined in relation with the film thickness (µm) of the surface-protecting layer; however, in consideration of various physical properties (post-processing suitability and suitability when used) required as a sheet and cost, the film thickness of the surface-protecting layer is approximately 10.0 µm or less, and preferably 7.0 µm or less. The optimal range of the average particle size is 2.0 µm or more and 4.0 µm or less. In the case (1), the content of an extender pigment to be added to the ink for forming the gloss-adjusting layer is preferably 5 to 15 parts by mass based on 100 parts by mass of the ink composition other than the extender pigment. If the content of the extender pigment is less than 5 parts by weight, sufficient thixotropy may not be imparted to the printing ink composition that forms the gloss-adjusting layer. If the content of the extender pigment is greater than 15 parts by weight, the effect of imparting a low-gloss feeling may be reduced.

The gloss value $G_A$ of the gloss-adjusting layer can be adjusted, for example, by a method to select the type of each of the substances, such as the above-mentioned vehicle, gloss-control resin, and colorant (including an extender pigment), or a method to suitably determine the content of each of the above substances.

Examples of the printing method for forming the gloss-adjusting layer include gravure printing, offset printing, screen printing, flexo printing, electrostatic printing, ink jet printing, etc., as with the printing method for forming the picture pattern layer mentioned above. Moreover, when a solid-like gloss-adjusting layer is formed on the entire surface, the same coating methods used to form the picture pattern layer can be used.

When the gloss-adjusting layer is formed in part of the front surface (in the case (1)), it is preferable that the gloss-adjusting layer have a picture pattern. In particular, it is more preferable that the gloss-adjusting layer be formed in a pattern shape, such as a dot, lattice, or wood-grain vessel pattern (shape). Because the gloss-adjusting layer is formed in the above pattern, a further difference is made between the gloss of a region in which the gloss-adjusting layer is present and the gloss of a region other than the gloss-adjusting layer (a region in which the gloss-adjusting layer is not present). As a result, an optical illusion of recesses (visual recesses) is generated, and such an optical illusion is recognized as a peculiar cubic effect. Therefore, unevenness (daku) is much less noticeable.

When the picture pattern layer is formed in the sheet of the present invention, it is preferable that a gloss-adjusting layer be formed so as to be linked (synchronized) with the pattern of the picture pattern layer. For example, when the picture pattern layer is formed in a wood-grain pattern, a sheet having more excellent designability can be obtained by forming a gloss-adjusting layer by pattern-printing of a wood-grain vessel pattern.

The thickness (film thickness) of the gloss-adjusting layer is preferably 0.5 µm to 10 µm, more preferably 0.5 µm to 7 µm, and even more preferably 0.5 µm to 5 µm, in consideration of printability and interaction with the surface-protecting layer-forming resin composition.

Back-Surface Primer Layer

A back-surface primer layer may be formed on the back surface (surface opposite to the surface on which the picture pattern layer is laminated) of the base material sheet, as required. For example, when the sheet of the present invention is a decorative sheet, the back-surface primer layer is effective when the decorative sheet and an adherend are laminated to form a decorative plate.

The back-surface primer layer can be formed by applying a known primer agent to the base material sheet. Examples of primer agents include urethane resin primer agents comprising an acrylic-modified urethane resin (an acrylic urethane resin), etc., primer agents comprising a urethane-cellulose resin (e.g., a resin obtained by adding hexamethylene diisocyanate to a mixture of urethane and nitrocellulose), resin primer agents comprising a block copolymer of acrylic and urethane, and the like. Additives may be added to the primer agent, as required. Examples of additives include fillers, such as calcium carbonate and clay, flame retardants, such as magnesium hydroxide, antioxidants, lubricants, foaming agents, ultraviolet absorbers, light stabilizers, etc. The amount of additives can be suitably determined according to product characteristics.

The coating amount of the primer agent is not particularly limited, but is generally about 0.1 to 100 g/m$^2$, and preferably about 0.1 to 50 g/m$^2$.

The thickness of the back-surface primer layer is not particularly limited, but is generally about 0.01 to 10 µm, and preferably about 0.1 to 1 µm.

Decorative Sheet

The sheet of the present invention can be suitably used as a decorative sheet because it has an excellent low-gloss feeling, the design represented on the sheet can be visually recognized when viewed obliquely, and the sheet has excellent designability. The use of the decorative sheet is not particularly limited, and the decorative sheet can be used for various purposes for which designability is required. For example, the decorative sheet is useful as a floor material decorative sheet used for floor materials, or a wall covering material decorative sheet used for wall covering materials.

The decorative sheet can be laminated on an adherend to form a decorative plate. The adherend is not limited, and adherends used for known decorative plates can be used. Examples of the adherend include wood-based materials, metal, ceramics, plastics, glass, and the like. In particular, wood-based materials can be preferably used for the decorative sheet. Specific examples of wood-based materials include sliced veneers, single panels, plywood panels, particleboards, medium-density fiberboards (MDF), chipboards, composite base materials in which a chipboard is laminated, and the like formed from various materials, such as Japanese cedar, Japanese cypress, zelkova, pine, lauan, teak, and melapi. Preferred wood-based materials are plywood panels, particleboards, and medium-density fiberboards (MDF).

The method for laminating the decorative sheet and an adherend is not limited. For example, the decorative sheet can be bonded to an adherend using an adhesive. The adhesive may be suitably selected from known adhesives depending on the type of adherend, etc. Examples thereof include polyvinyl acetate, polyvinyl chloride, vinyl chloride-vinyl acetate copolymer, ethylene-acrylic acid copolymer, ionomer, butadiene-acrylonitrile rubber, neoprene rubber, natural rubber, and the like. These adhesives can be used singly or in a combination of two or more.

The thus-produced decorative plate can be used, for example, for interior materials of buildings, such as walls, ceilings, and floors; exterior materials, such as balconies and verandas; surface decorative plates of fittings, such as sashes, doors, and balustrades, and furniture; surface decorative plates of cabinets of light electrical appliances and office automation equipment; or the like. In particular, the decorative plate can be preferably used as a floor decorative material.

Advantageous Effects of Invention

In the sheet of the present invention, a surface of the sheet has an arithmetic average roughness Ra (JIS B0633: 2001) of 0.7 µm or less, and the reflectance at a detection angle equal to a regular reflection angle ±5°, measured by a variable angle photometer when the surface is irradiated with incident light at an incident angle of 75°, is 50% or less of the reflectance at the regular reflection angle. Therefore, the sheet has an excellent low-gloss feeling; even when oblique light is incident on the surface, diffuse reflection of the light is suppressed, the surface is less likely to look white when viewed obliquely, and a design represented on the sheet can be visually recognized; and the sheet has excellent designability.

DESCRIPTION OF EMBODIMENTS

Figure 1:
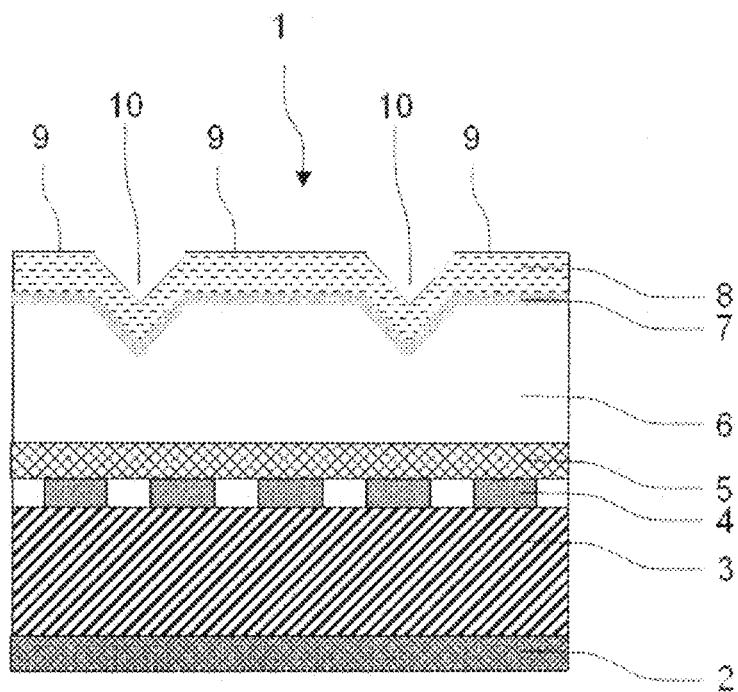
FIG. 1 is a cross-sectional view showing an example of the sheet of the present invention.
Figure 2:
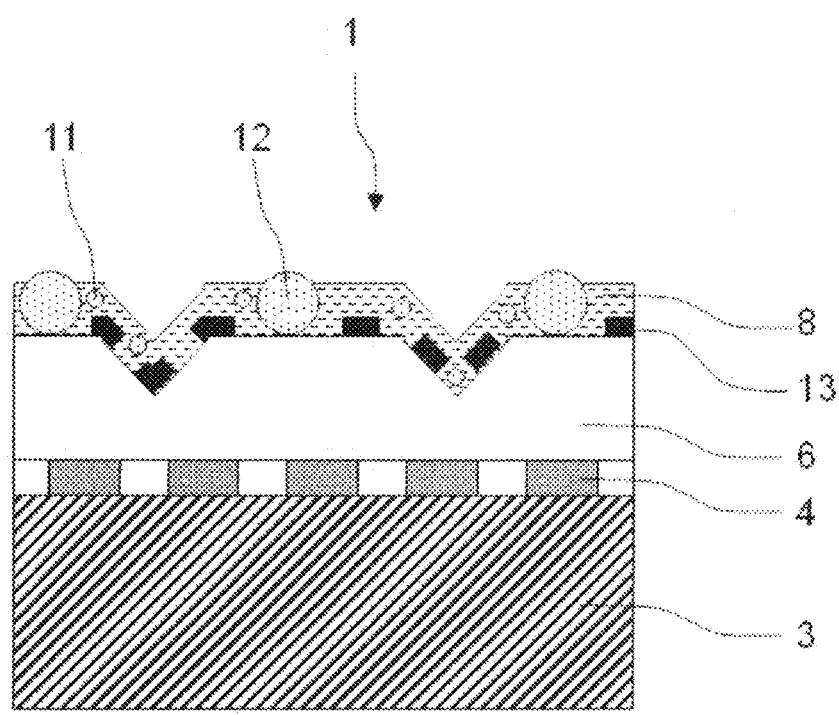
FIG. 2 is a cross-sectional view showing an example of the sheet of the present invention.
Figure 3:
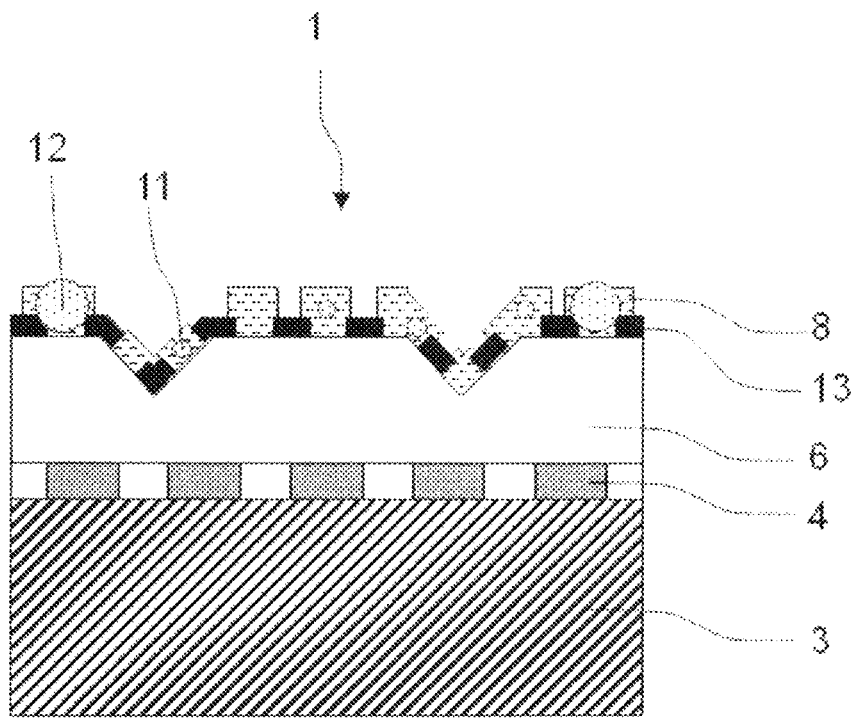
FIG. 3 is a cross-sectional view showing an example of the sheet of the present invention.
Figure 4:
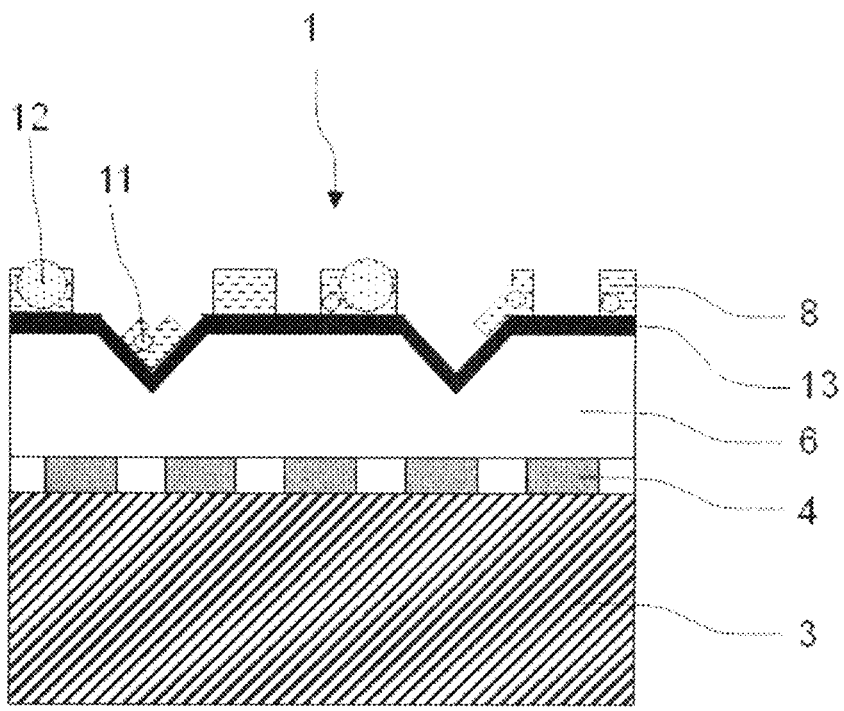
FIG. 4 is a cross-sectional view showing an example of the sheet of the present invention.

The present invention is explained in detail below with reference to Examples and a Comparative Example. However, the present invention is not limited to these Examples.

Example 1

A 60-µm-thick polypropylene film, to which a corona discharge treatment was performed on both surfaces thereof, was prepared as a base material sheet. The back surface of the polypropylene film was coated with a two-component curable urethane resin, thereby forming a 2-µm-thick back-surface primer layer.

A 2-µm-thick picture pattern layer was formed by gravure printing on the front surface of the polypropylene film using printing ink comprising a two-component curable acryl urethane resin.

The picture pattern layer was coated with a two-component curable urethane resin adhesive to a solids content of 3 g/m$^2$, thereby forming a 3-µm-thick adhesive layer. A polypropylene-based resin was thermally melted and extruded on the adhesive layer using a T-die extruder, thereby forming an 80-μm-thick transparent resin layer.

Subsequently, the surface was subjected to a corona discharge treatment, and then coated with a two-component curable urethane resin to a solids content of 1 g/m², thereby forming a primer layer (surface-protecting layer-forming primer layer; thickness: 2 μm).

The front surface of the primer layer was coated with a resin composition of a urethane acrylate-based electron beam-curable resin (EB resin) comprising 15 parts by mass of silica fine particles having an average particle size of 3 μm based on 100 parts by mass of the resin solids content by a roll coating method so that the solids content of the resin composition was 15 g/m², and so that the thickness (layer thickness) after curing was 15 μm. Then, the electron beam-curable resin was cured by irradiation with an electron beam using an electron beam irradiation device in an environment with an oxygen concentration of 200 ppm or less at an acceleration voltage of 125 KeV with a dose of 5 Mrad, thereby forming a surface-protecting layer. Thus, a decorative sheet (total thickness: 164 μm) was produced.

Example 2

A sheet of Example 2 was produced in the same manner as in Example 1, except that the surface-protecting layer further contained, in addition to the silica fine particles, 5 parts by mass of acrylic beads having a particle size of 3 μm based on 100 parts by mass of the resin solids content.

Example 3

A sheet of Example 3 was produced in the same manner as in Example 1, except that the surface-protecting layer contained, as extender pigments, 10 parts by mass of fine particles A having a particle size equal to or less than the thickness of the surface-protecting layer (average particle size: 3 μm) based on 100 parts by mass of the resin solids content, and 10 parts by mass of fine particles B having a particle size greater than the thickness of the surface-protecting layer (average particle size: 16 μm) based on 100 parts by mass of the resin solids content.

Example 4

Preparation of Gloss-Adjusting Layer-Forming Ink

Gloss-adjusting layer-forming ink was prepared by mixing 7.5 parts by mass of ocher (iron oxide) as a coloring pigment and 7 parts by mass of silica particles having an average particle size of 4 μm with 100 parts by mass (6.0 parts by mass as the resin content) of coloring ink comprising a polyvinyl butyral resin as a vehicle.

The gloss-adjusting layer-forming ink was applied to the entire front surface of a primer layer by a gravure printing method to form a gloss-adjusting layer. A surface-protecting layer was formed on the front surface of the gloss-adjusting layer in the same manner as in Example 1, except that the thickness, the average particle size of silica, the Ra of the surface, and the reflectance ratio were changed as shown in Table 2. A sheet of Example 4 was produced in the same manner as in Example 1 except for the above.

Example 5

Gloss-adjusting layer-forming ink prepared in the same manner as in Example 4 was applied to the front surface of a primer layer by a gravure printing method in a vessel picture pattern shape to form a gloss-adjusting layer. A surface-protecting layer was formed on the entire surface of the gloss-adjusting layer in the same manner as in Example 1, except that the thickness, the average particle size of silica, the Ra of the surface, and the reflectance ratio were changed as shown in Table 2. A sheet of Example 5 was produced in the same manner as in Example 1 except for the above.

Comparative Example 1

A sheet of Comparative Example 1 was produced in the same manner as in Example 1, except that silica fine particles having an average particle size of 10 μm were used in the surface-protecting layer, and the irregular shape formed on the surface of the sheet by the silica fine particles, which contributed to designability and imparted texture, was changed as shown in Table 1.

The sheets of Examples 1 to 5 and Comparative Example 1 were evaluated by the following evaluation methods.

Evaluation Method

Ra (Arithmetic Average Roughness)

Ra was measured by a measurement method according to JIS B0633: 2001. The measurement was performed using SURFCOM FLEX-50A (produced by Tokyo Seimitsu Co. Ltd.).

Ratio of the Reflectance at a Regular Reflection Angle ±5° to the Reflectance at the Regular Reflection Angle The reflectance at a regular reflection angle and the reflectance at the regular reflection angle ±5° when incident light was incident at an incident angle of 75° were measured using a variable angle photometer (trade name: GC5000L, produced by Nippon Denshoku Industries Co., Ltd.). In this measurement method, the incident angle and the regular reflection angle refer, respectively, to the angles of incident light and reflected light relative to the normal line of the surface of the sheet. Using the measured reflectance at the regular reflection angle and reflectance at the regular reflection angle ±5°, the ratio of the reflectance at the regular reflection angle ±5° to the reflectance at the regular reflection angle was calculated by the following formula:

[Ratio of reflectance at regular reflection angle ±5° to reflectance at regular reflection angle (%)]= [(reflectance at regular reflection angle ±5° (%))/(reflectance at regular reflection angle (%))]×100

Evaluation of Visibility of Picture Pattern

The visibility of the picture pattern of each sheet was evaluated. Specifically, the state of the surface of each decorative sheet was visually observed at an angle of 60° or more (oblique light) and an angle of 0° (front) relative to the normal line of the sheet surface. The observation results were evaluated according to the following evaluation criteria.

A+: No white shining in oblique light observation, and no cloudiness in front observation.

A: No white shining in oblique light observation, but slight cloudiness in front observation.

C: White shining in oblique light observation, and no visual recognition of picture pattern.

Designability

The appearance of each sheet was observed by 20 subjects (adult men and women), and whether a wooden texture was expressed was evaluated according to the following evaluation criteria.

A+: 90% or more of the subjects determined that a wooden texture was expressed.

A: 70% or more and less than 90% of the subjects determined that a wooden texture was expressed.
B: 50% or more and less than 70% of the subjects determined that a wooden texture was expressed.
C: Less than 50% of the subjects determined that a wooden texture was expressed.
Scratch Resistance (Micro-Scratch Test)
Gloss Test (A Test)

The sheets prepared in the Examples and the Comparative Example were each attached to a friction table part of a Martindale abrasion tester ("Martindale 1300 series, model 1302 (model number)," produced by James Heal), and the surface of the sheet was polished with Scotch-Brite Fleece SB7447 (produced by Sumitomo 3M Limited). Specifically, a test was conducted by polishing the surface of the sheet with the round Scotch-Brite (diameter: 9 cm) at a load of 6 N (load: 9 g/cm$^2$) at a rotational frequency of 80 (5 Lissajous orbits). The 60° gloss values before and after the test were measured, and the rate of change in the gloss value was calculated based on the following formula:

(Rate of change in gloss value) (%)={[(gloss value before test)−(gloss value after test)]/(gloss value before test)}×100

The calculated rate of change was evaluated according to the following evaluation criteria.
A+: The rate of change in the gloss value is less than 15%.
A: The rate of change in the gloss value is 15% or more and less than 20%.
B: The rate of change in the gloss value is 20% or more and less than 30%.
C: The rate of change in the gloss value is 30% or more.
Scratch Test (B Test)

The sheets prepared in the Examples and the Comparative Example were each attached to a friction table part of a Martindale abrasion tester ("Martindale 1300 series, model 1302 (model number)," produced by James Heal), and the surface of the sheet was polished with Scotch-Brite Fleece SB7440 (produced by Sumitomo 3M Limited). Specifically, a test was conducted by polishing the surface of the sheet with the round Scotch-Brite (diameter: 9 cm) at a load of 4 N (load: 6 g/cm$^2$) at a rotational frequency of 160 (10 Lissajous orbits). Scratches on the surface of the sheet after the test were visually observed and evaluated according to the following evaluation criteria.

A+: No scratches are found on the surface of the sheet.
A: A few scratches are found on the surface of the sheet.
B: Many scratches are found on the surface of the sheet.
C: A great number of scratches are found on the surface of the sheet.

The following Tables 1 and 2 show the results.

TABLE 1

|  |  | Example 1 | Example 2 | Comparative Example 1 |
|---|---|---|---|---|
| Surface-protecting layer | Thickness (μm) | 15 | 15 | 15 |
|  | Extender pigment | Silica | Silica | Silica |
|  | Average particle size of extender pigment (μm) | 3 | 3 | 10 |
|  | Resin beads | None | Added | None |
| Ra of sheet surface (μm) |  | 0.7 | 0.7 | 0.9 |
| Ratio of reflectance at regular reflection angle ±5° to reflectance at regular reflection angle (%) |  | 50 | 50 | 70 |
| Visibility of design |  | A | A+ | C |

TABLE 2

|  |  | Example 1 | Example 3 | Example 4 | Example 5 |
|---|---|---|---|---|---|
| Surface-protecting layer | Thickness (μm) | 15 | 15 | 15 | 15 |
|  | Fine particles A (extender pigment) | Silica | Silica | Silica | Silica |
|  | Average particle size of fine particles A (μm) | 3 | 3 | 3 | 3 |
|  | Fine particles B (extender pigment) | — | Silica | — | — |
|  | Average particle size of fine particles B (μm) | — | 16 | — | — |
|  | Resin beads | None | None | None | None |
| Gloss-adjusting layer |  | None | None | Formed | Formed |
| Coating method of gloss-adjusting layer |  | — | — | Entire surface | Pattern shape |
| Ra of sheet surface (μm) |  | 0.7 | 0.7 | 0.5 | 0.6 |
| Ratio of reflectance at regular reflection angle ±5° to reflectance at regular reflection angle (%) |  | 50 | 50 | 45 | 45 |
| Visibility of design |  | A | A | A+ | A+ |
| Designability |  | A | A | A | A+ |
| Scratch resistance (micro-scratch test) | Gloss test (A test) | A | A+ | A | A |
|  | Scratch test (B test) | A | A+ | A | A |

REFERENCE SIGNS LIST

1. Sheet
2. Back-surface primer layer
3. Base material sheet
4. Picture pattern layer
5. Adhesive layer
6. Transparent resin layer
7. Primer layer
8. Surface-protecting layer
9. Plane part having an irregular shape formed by an extender pigment, etc., on the surface thereof
10. Wood-grain vessel pattern
11. Fine particles A
12. Fine particles B
13. Gloss-adjusting layer

The invention claimed is:
1. A sheet, wherein a surface of the sheet has an arithmetic average roughness Ra (JIS B0633: 2001) of 0.7 μm or less, and the reflectance at a detection angle equal to a regular reflection angle ±5°, measured by a variable angle photometer when the surface is irradiated with incident light at an incident angle of 75°, is 50% or less of the reflectance at the regular reflection angle, wherein the sheet has a surface-protecting layer comprising an ionizing radiation-curable resin on an uppermost surface, wherein the surface-protecting layer comprises silica fine particles and resin beads.

2. A sheet, wherein a surface of the sheet has an arithmetic average roughness Ra (JIS B0633: 2001) of 0.7 µm or less, and the reflectance at a detection angle equal to a regular reflection angle ±5°, measured by a variable angle photometer when the surface is irradiated with incident light at an incident angle of 75°, is 50% or less of the reflectance at the regular reflection angle, wherein the sheet has a picture pattern layer and a transparent resin layer comprising a polyolefin resin, wherein at least the picture pattern layer, the transparent resin layer, and the surface-protecting layer are laminated in this order on a base material sheet.

3. A sheet, wherein a surface of the sheet has an arithmetic average roughness Ra (JIS B0633: 2001) of 0.7 µm or less, and the reflectance at a detection angle equal to a regular reflection angle ±5°, measured by a variable angle photometer when the surface is irradiated with incident light at an incident angle of 75°, is 50% or less of the reflectance at the regular reflection angle, wherein the sheet is a decorative sheet.

4. The sheet according to claim 3, wherein the sheet is a decorative sheet for floor materials.

5. The sheet according to claim 1, wherein the ionizing radiation-curable resin is at least one member selected from the group consisting of acrylate resins, polyester resins, and epoxy resins.

6. The sheet according to claim 2, wherein the sheet has a transparent resin layer comprising a polyolefin resin.

7. The sheet according to claim 1, wherein the sheet has a transparent resin layer comprising a polyolefin resin.

8. The sheet according to claim 3, wherein the sheet has a picture pattern layer.

9. The sheet according to claim 1, wherein the sheet has a picture pattern layer.

10. The sheet according to claim 2, wherein the sheet has a thickness of 50 to 600 µm.

11. The sheet according to claim 1, wherein the sheet has a thickness of 50 to 600 µm.

12. The sheet according to claim 2, wherein the sheet is a decorative sheet.

13. The sheet according to claim 1, wherein the sheet is a decorative sheet.

14. The sheet according to claim 1, wherein the sheet is a decorative sheet for floor materials.

15. The sheet according to claim 2, wherein the ionizing radiation-curable resin is at least one member selected from the group consisting of acrylate resins, polyester resins, and epoxy resins.

16. The sheet according to claim 3, wherein the sheet has a thickness of 50 to 600 µm.

17. The sheet according to claim 2, wherein the sheet has a surface-protecting layer comprising an ionizing radiation-curable resin on an uppermost surface, wherein the surface-protecting layer comprises silica fine particles and resin beads.

18. The sheet according to claim 3, wherein the sheet has a surface-protecting layer comprising an ionizing radiation-curable resin on an uppermost surface, wherein the surface-protecting layer comprises silica fine particles and resin beads.

* * * * *